Jan. 14, 1930.  H. J. MELVILLE  1,743,227
CONFECTION COATING MACHINE
Filed March 31, 1927    4 Sheets-Sheet 1
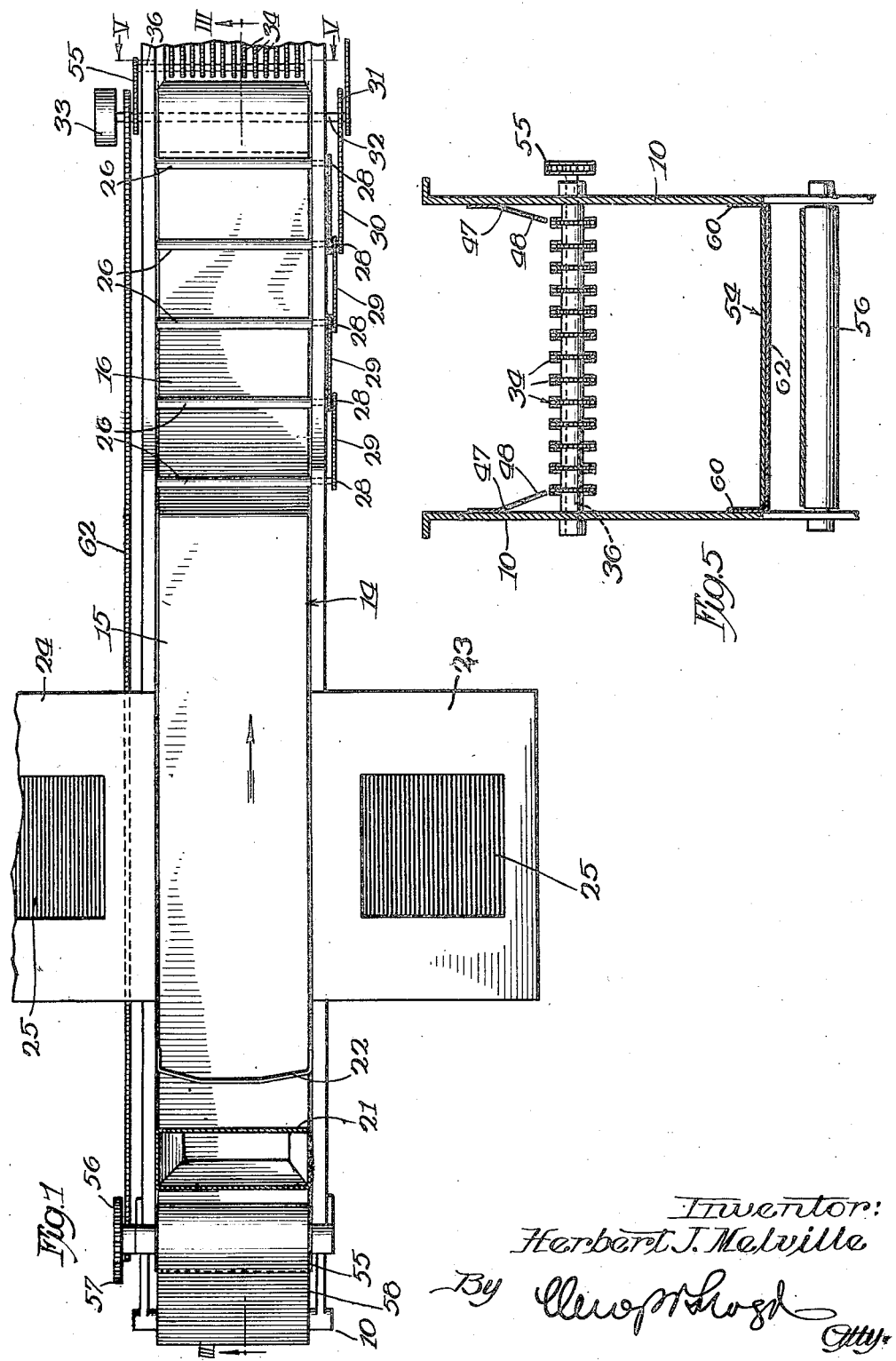
Inventor:
Herbert J. Melville

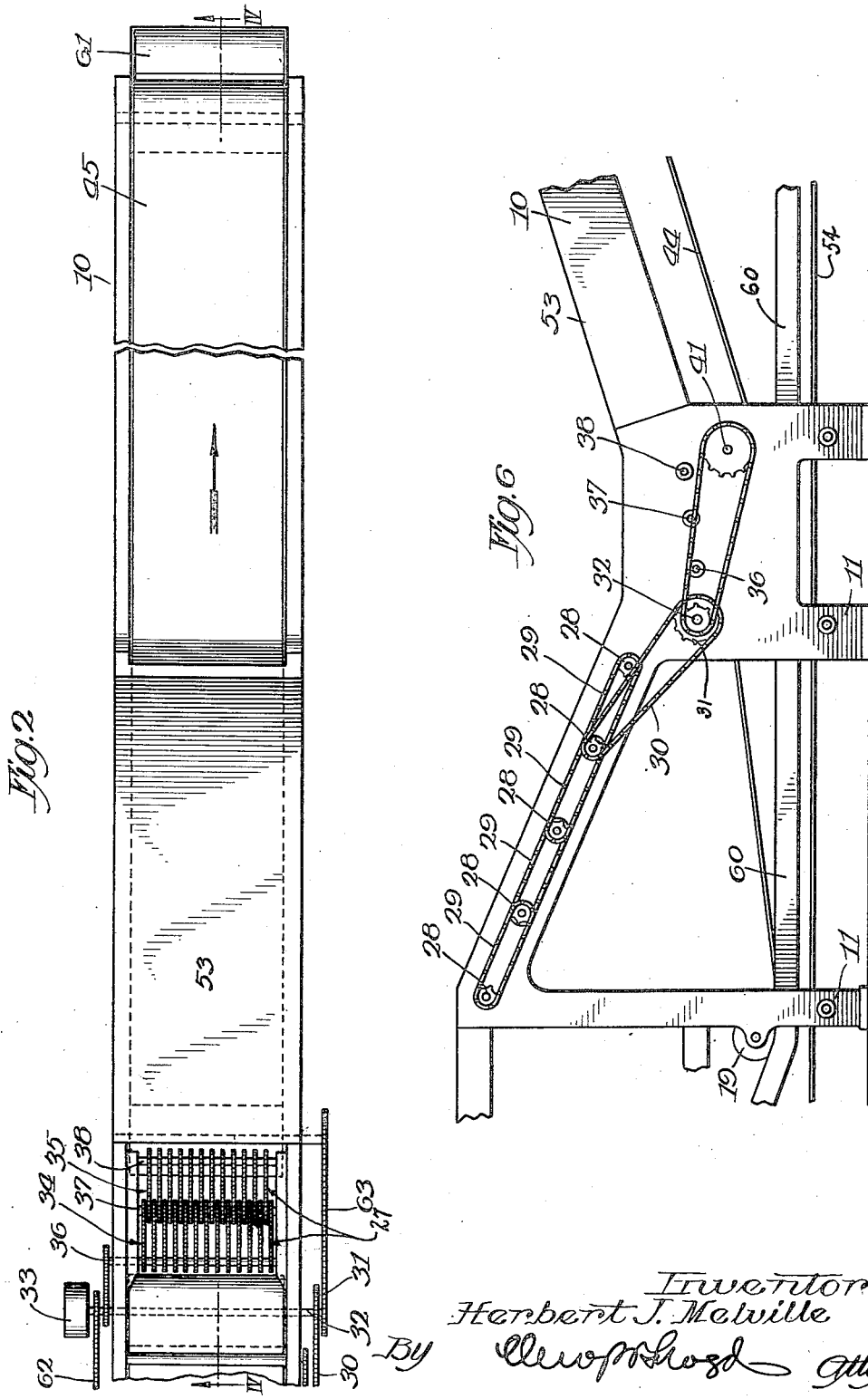

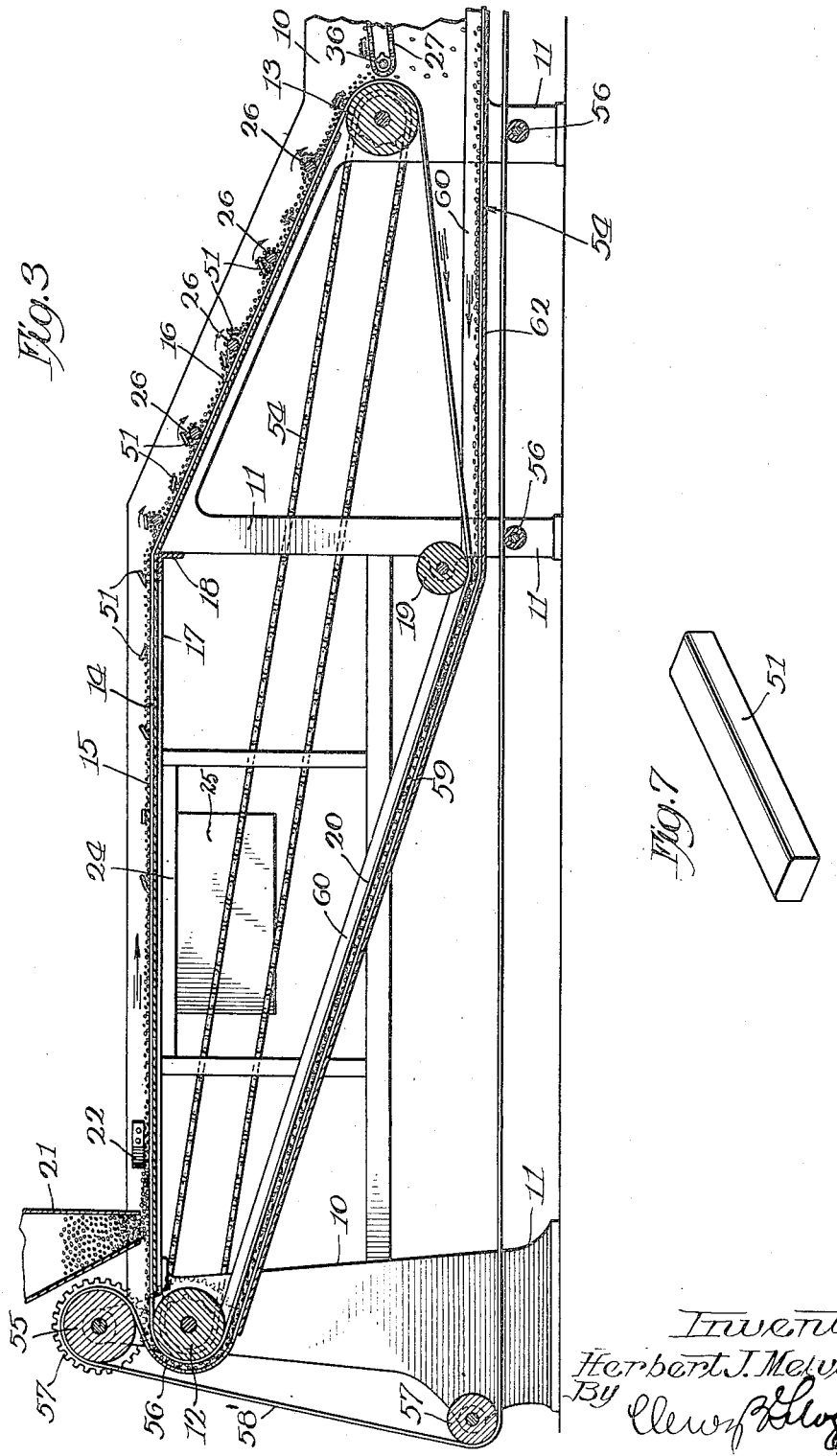

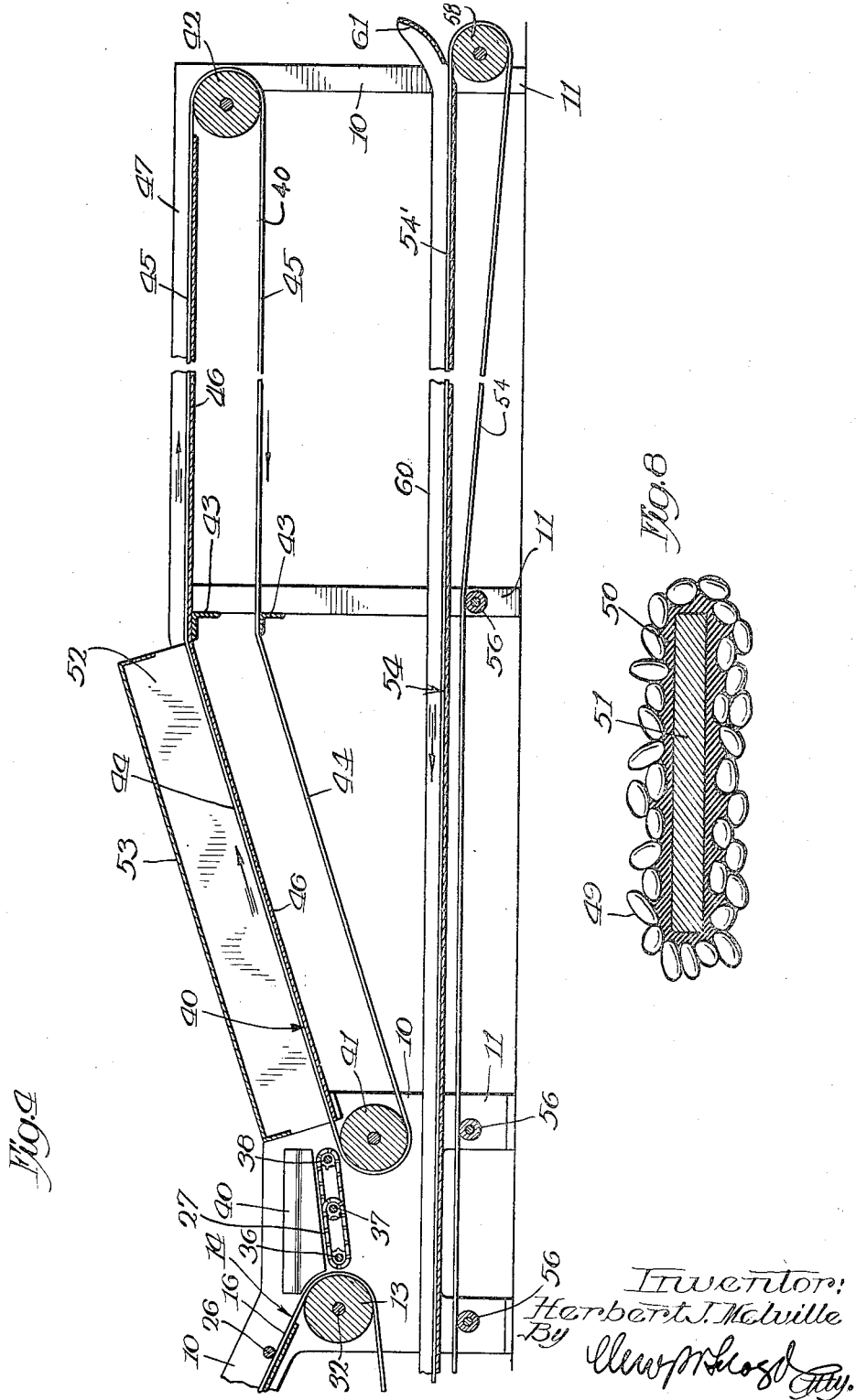

Patented Jan. 14, 1930

1,743,227

UNITED STATES PATENT OFFICE

HERBERT J. MELVILLE, OF CHICAGO, ILLINOIS, ASSIGNOR TO THE CURTISS CANDY COMPANY, OF CHICAGO, ILLINOIS, A CORPORATION OF ILLINOIS

CONFECTION-COATING MACHINE

Application filed March 31, 1927. Serial No. 179,841.

This invention relates to candy machines and more particularly to confection enrobers.

It contemplates more especially the provision of means for enrobing and embedding a core with a coating or other edible particles adhesively or otherwise associated therewith as by partially embedding substances therein to constitute an edible casing which wholly or partially seals the core therein.

Machines of known construction have not proven entirely satisfactory in that the enrobing substances, comprising in this instance a chocolate casing having nuts embedded therein, are comparatively expensive; therefore it is necessary or at least highly desirable to utilize such materials without the usual waste attendant the production of enrobed confections.

Further, it has heretofore been necessary to entail much labor and expense in the commercial production of such confections, which is materially reduced with the practice of the present invention by eliminating the necessity of having numerous individuals resort to hand operations.

One object of the present invention is to simplify the construction and improve the operation of devices of the character mentioned.

Another object is the provision of means for enrobing a surface of a confection with peanuts or similar substances.

Still an other object is the provision of means in association with an enrober, for effecting a return of the surplus embedding substances.

A further object is to provide means for embedding surfaces of edible cores with peanuts and similar substances without the usual attendant waste.

A still further object is to provide means for effecting the return of surplus substances in enrobers, thereby utilizing all materials without the usual waste incident thereto.

Still a further object is to provide means for associating edible particles with an adhesively sealed core.

Other objects and advantages will appear from the following description of an illustrated embodiment of the present invention.

In the drawings:

Figure 1 is a fragmentary plan view of one portion of a machine embodying features of the present invention;

Figure 2 is a plan view of a complemental portion of the machine shown in Figure 1;

Figure 3 is a sectional view in elevation of the portion of the machine on the line III—III of Figure 1;

Figure 4 is a sectional view in elevation taken substantially along line IV—IV of Figure 2;

Figure 5 is a sectional view taken substantially along line V—V of Figure 1;

Figure 6 is a fragmentary view in elevation of the intermediate portion of the machine shown in Figure 4;

Figure 7 is a perspective view of a bar which may be provided with partially embedded edible particles such as peanuts by practicing the present invention; and Figure 8 is a sectional view taken through a confection after it has passed through the machine constituting the present invention.

The structure selected for illustration comprises a frame 10 of any suitable construction which is elevated from the floor by means of standards 11 appropriately spaced to support the structure in any desired manner, it being noted that the frame 10 is preferably though not essentially, of sectional construction owing to its comparatively great length.

A pair of rollers 12 and 13 are journalled at spaced points on the frame 10, they being preferably at different elevations to guide an endless conveyor constituting in this instance a belt 14, along a predetermined path. The belt 14 has in this instance a horizontal portion 15 contiguous with an inclined portion 16 disposed in an angular plane with respect to the portion 15.

In order to dispose the belt 14 in the desired planes, the portion 15 is guided on supports 17 terminating in a bracket 18 fixed to a standard 11, at which position the inclined portion 16 commences. An idler roller 19 is journalled in a suitable bracket fixed to the standard 11 to define an inclined portion 20 which constitutes the return side of the conveyor 14, the portion 20 being inclined for reasons which will appear more fully hereinafter.

A hopper 21 is positioned above the conveyor 14 to supply edible particles thereto such as peanuts which are spread over the surface of the horizontally disposed portion 15 of the conveyor 14, this being accomplished by means of a bar 22 which is effective to cause a uniform spread of the peanuts as it leaves the hopper 21 when the belt 14 moves in a clockwise direction.

Suitable dipping tanks 23 and 24 are supported by the frame 10 on either side of the conveyor 14 to confine a supply of chocolate or other coating material in the depressed portions 25 thereof which is preferably heated to maintain the chocolate in the desired fluid state. Any suitable edible core 51 preferably of bar-like form, is dipped, in this instance, by hand in the chocolate containing tanks 25 to receive a coating serving as an adhesive for the edible particles supplied to the conveyor 14. The coated cores 51 are placed on the horizontal portion 15 of the conveyor 14 to be carried along a predetermined path defined thereby. It is to be noted that when the cores 51 are placed on the portion 15 of the belt 14, a surface thereof will contact with the edible particles which are held thereto by the coating which is in a softened condition at that time.

To enable all of the surfaces of the core 51 to be supplied with partially embedded particles such as peanuts, tumbling means are disposed in the path of the articles so as to impart a tumbling movement thereto to effect contact of the various surfaces thereof with the peanuts on the conveyor 14, this being preferably accomplished by disposing a plurality of spaced rods 26 transversely of the belt 14 on the inclined portion 16 thereof.

With this construction, the articles carried by the conveyor 14 will be caused to move over the rods 26 responsive to the movement of the conveyor 14 thereunder, whereby they are turned in various positions to effect contact of all the surfaces thereof with the peanuts contained on the belt 16 intermediate the rods 26. Any number of rods 26 may be employed as technical practice may dictate to effectively tumble the articles in most every direction prior to their discharge on another conveyor 27.

It has been found desirable to impart rotation to the rods 26 to effect the desired results, and in view thereof each of the rods 26 has a sprocket wheel 28 fixed to the extremity thereof to mesh with suitable inter-connecting chains 29. One of the sprockets 28 is geared to a power source by virtue of a chain 30 meshing therewith and a sprocket 31 fixed to a shaft 32 in any suitable manner. As a result, the rods 26 rotate responsive to movement of the shaft 32 to effect the desired tumbling action as the bars or other articles are carried thereover owing to the application of power to a pulley 33 fixed to the shaft 32.

It will be understood that there doubtless will be a surplus of edible particles on the conveyor 14 so that it will be highly desirable to provide means to insure a return of the surplus peanuts to a position enabling their further utilization on confections being constantly placed on the portion 15 of the conveyor 14. For this reason, the conveyor 27 is composed preferably of alternately spaced belts or chains 34 and 35 which are geared in the usual manner to spaced shafts 36—37 and 37—38, respectively. This construction serves the purpose of a perforated conveyor for receiving the confections from the inclined portion 16 of the conveyor 14 as the shaft 36 is disposed somewhat below and adjacent the roller 13 constituting the discharge end of the conveyor 14.

The edible particles, in this instance the peanuts, contained on the incline 16 of the belt 14 will be discharged onto the perforated conveyor 27 which receives not only the enrobed confections, but also the surplus peanuts which are not attached or applied to the confections. The edible particles such as peanuts are of such size as to fall between the individual belts 34 and 35 whereby the confection are carried thereon to another conveyor 40, the receiving end thereof being disposed below and adjacent the conveyor 27 by virtue of the roller 41 journalled to the frame 10 to co-act with another roller 42 spaced therefrom and disposed thereabove to carry the endless belt or conveyor 40 therebetween. A standard 11 disposed intermediate the rollers 41 and 42 carries a pair of brackets 43 which are spaced to define an inclined portion 44 and a contiguous horizontally disposed portion 45 wherefrom the enrobed confections may be removed or discharged in any suitable manner. It is to be noted that the carrying faces of the conveyor 40 are supported on a trough 46 having upstanding edges 47 to retain the peanuts therebetween on the belt 40.

To guide the confections from the conveyor 14 to the conveyor 27 which bridges the gap between the conveyors 14 and 40, a pair of guides constituting plates 47 are secured to the frame 10 (Figure 5) in such a manner as to define a portion 48 bent from the frame 10 to slightly overhang the end belts or chains 34 and 35 of the conveyor 27, thereby confining the movement of the confections within the limits of the conveyor 27.

The confections are discharged from the conveyor 27 to the conveyor 40 which travels in a clockwise direction to gradually elevate the articles or confections along the incline 44 to a position where the conveyor 40 is disposed in a horizontal plane 45 where the attendant grasps the confection in the hand to further embed the edible particles such as peanuts 49 in the casing 50 which, in this instance, seals the core 51 which may be of marshmallow or other edible substances. By grasping the confection and further embedding the peanuts 49 therein, a predetermined uniform shape is imparted thereto, thereby insuring a firm association of the peanuts 49 with the coating 50 having adhesive characteristics in a softened state.

The inclined portion 44 of conveyor 40 is preferably provided with upstanding guides 52 on either side thereof, which terminate in a cover 53 adapted to shield the confection from foreign substances which may be prevalent in the atmosphere. It will be understood that artificial heating means may be provided within the compartment defined by the guides 52 and the cover 53 should commercial practice dictate the use of such an expedient.

It must be appreciated that in order to effectively embed the coated surface of the confection with a uniform mass of edible particles such as peanuts, it is necessary or at least highly desirable to cover the surface of the conveyor 14 with a uniform layer of particles. Obviously, all of the particles, in this instance peanuts, will not be attached to the confections carried by the conveyor 14, and as a consequence thereof it is highly desirable to provide means for effecting the return of the superfluous peanuts as such substances are comparatively expensive.

The present invention contemplates the use of the means for returning the peanuts to a position on the conveyor 14 so that they may be utilized as they again pass through the path described above. The return means comprises, in this instance, an endless conveyor 54 which travels over a roller 55 journalled above and geared to the roller 12, supra, by virtue of intermeshing gears 56 and 57 fixed to the shafts carrying the rollers 12 and 55, respectively. Another roller 58 is journalled to a standard 11 at the other extreme position of the frame 10, the latter roller being disposed near the floor upon which the frame 10 rests so that a portion of the conveyor 54 will be disposed below the mechanism hereinabove described, especially below the conveyor 27 and the horizontal portion 45 of the conveyor 40.

A portion 54' of the conveyor 54 is disposed in a horizontal position below the conveyors 27 and 40, supra, by means of a plurality of idlers 56 journalled to the standard 11 to co-act with another idler 57 disposed on the opposed face of the belt below the roller 55 and to the left thereof so as to dispose the receding portion 58' from the roller 12 a distance sufficient to prevent frictional contact therebetween.

The portion 54' of the conveyor 54 terminates in an inclined portion 59 which co-acts with the corresponding inclined portion 20 of the conveyor 14 to carry the excess or superfluous peanuts therebetween as the conveyor belt 54 moves in a counter clockwise direction in unison with the conveyor. The idler 19 defines the path of travel for the inclined portion 59 which commences to contact therewith as is obvious from the showing in Figure 3. Suitable troughs 60 are disposed below the belt or conveyor 54 as a support therefor and to prevent any lateral displacement of the peanuts from the surface thereof, thereby insuring the return of all the excess peanuts. As shown, the trough or raceway 60 terminates in a curved extremity 61 to catch the excess peanuts which may be carried by the conveyor 40 and discharged from the end thereof defined by the roller 42 disposed above and slightly to the left of the curved extremity 61.

Movement is imparted to the various conveyors described above by means of power supplied to any of the rollers described above, in this instance to the shaft 32 carrying the roller 13 which is operatively connected to the roller 12 by means of a chain 62 meshing with suitable sprockets fixed thereto. Likewise, the conveyors 27 and 40 are operatively connected to the power source by means of the chains 63 and 64 which operatively connect all of the moving instrumentalities to a common power source through the medium of the pulley 33 on the shaft 32. Obviously, other suitable expedients may be employed to impart the desired movement to the various instrumentalities to attain the desired result.

It is to be noted that the confections need not in every instance be coated prior to the application of edible particles to the surface thereof, as the consistency of the confection may be such as to obviate the necessity of resorting to this expedient; however, a chocolate coating is desirable as it improves the taste of the confection as well as serves as an adhesive and embedding surface for the edible particles such as peanuts.

Various changes may be made in the embodiment of the invention herein specifically described without departing from or sacrificing any of the advantages thereof as defined in the appended claims.

I claim:

1. The combination with an endless belt for carrying articles along a predetermined path, a hopper disposed thereabove to supply edible particles thereto, a series of rods above said belt to impart a tumbling action to said articles in their passage thereover to effect contact of the article surfaces with said edible particles, and means for effecting the return of the surplus particles to the article carrying means.

2. The combination with an endless belt for carrying articles along a predetermined path, a hopper disposed thereabove to supply edible particles thereto, a series of rods above said belt to impart a tumbling action to said articles in their passage thereover to effect contact of the article surfaces with said edible particles, and an endless belt co-acting with said article carrying belt to effect the return of the surplus edible particles.

3. The combination with an endless belt disposed in contiguous angularly related planes, and means co-operating with said belt on an inclined portion thereof to impart a tumbling action to articles carried by said belt.

4. The combination with an endless belt disposed in contiguous angularly related planes, and means co-operating with said belt on an inclined portion thereof to impart a tumbling action to articles carried by said belt, said means comprising a series of spaced rods disposed at an angle to the direction of movement of said belt.

5. The combination with an endless belt disposed in contiguous angularly related planes, means co-operating with said belt on an inclined portion thereof to impart a tumbling action to articles carried by said belt, said means comprising a series of spaced rods disposed at an angle to the direction of movement of said belt, and means co-operable with said belt to effect the return of articles therebetween.

6. The combination with an endless belt for carrying articles along a predetermined path, a hopper disposed thereabove to supply edible particles thereto, a series of rods above said belt to impart a tumbling action to said articles in their passage thereover to effect contact of the article surfaces with said edible particles, means for effecting the return of the surplus particles to the article carrying means, and means for rotating said rods.

HERBERT J. MELVILLE.